Figure 1:
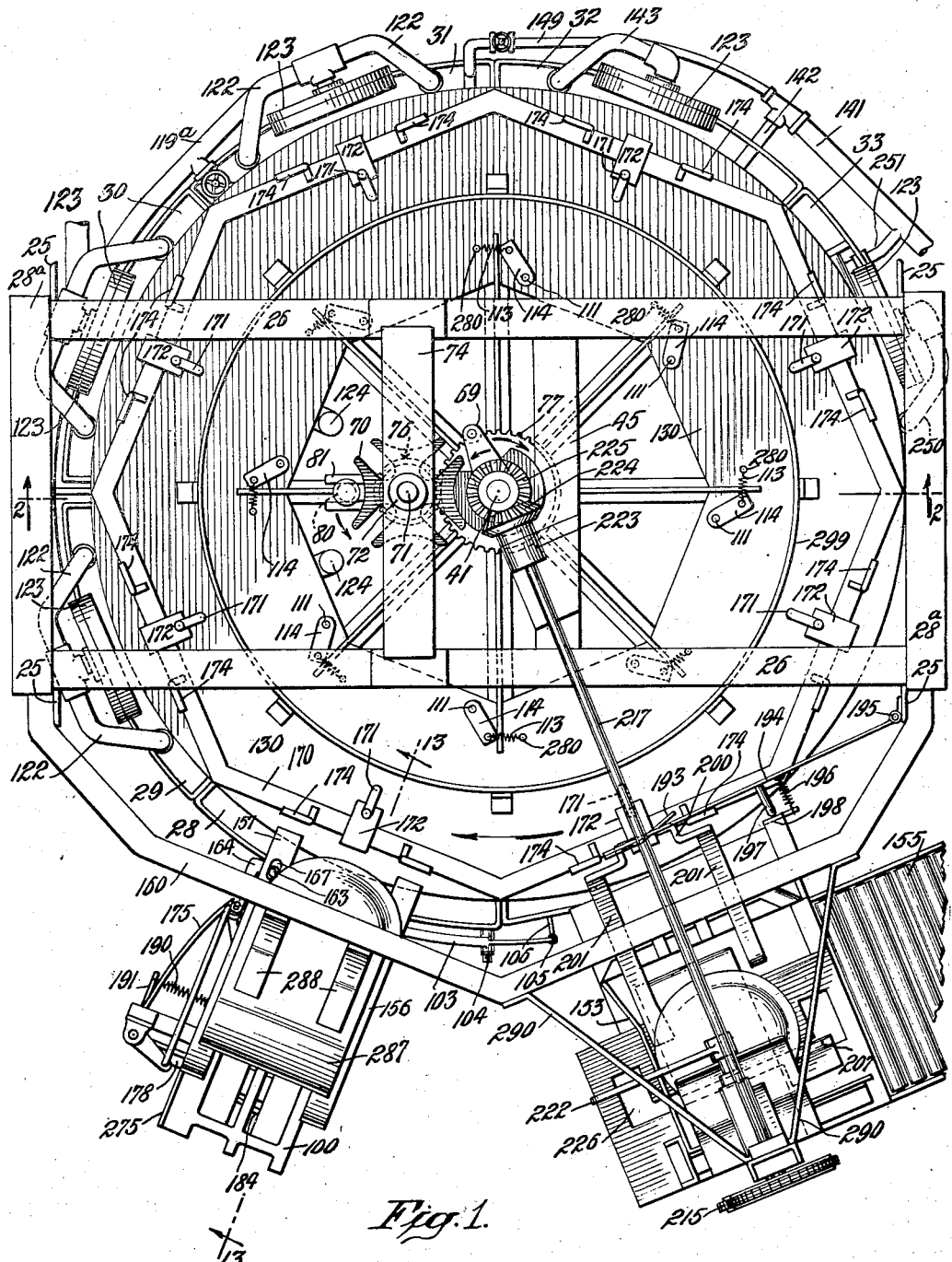

Sept. 15, 1936. J. M. McCLATCHIE 2,054,293
APPARATUS FOR WASHING CANS AND THE LIKE
Filed Feb. 21, 1934 12 Sheets-Sheet 1

INVENTOR
JOHN M. McCLATCHIE
BY
ATTORNEYS

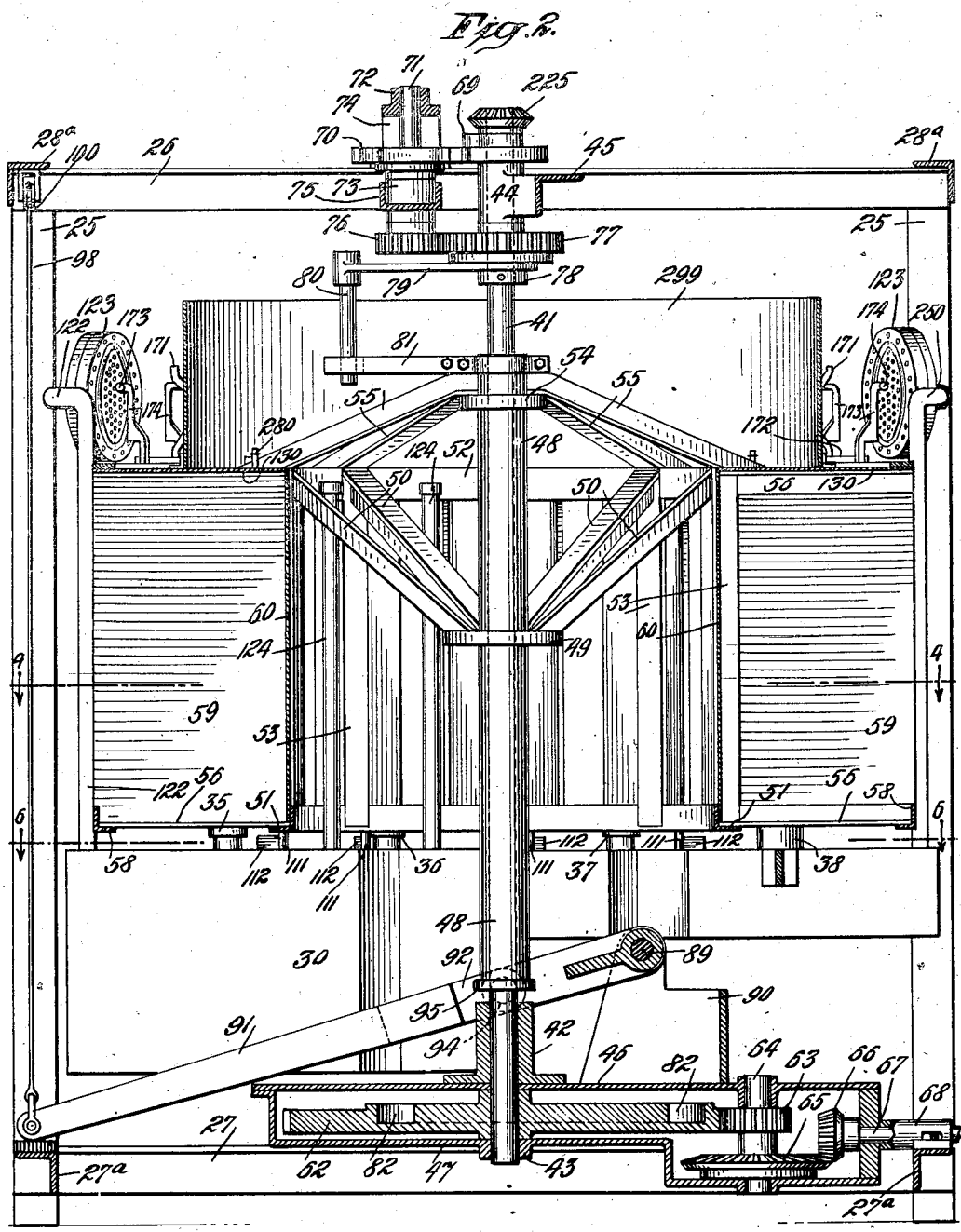

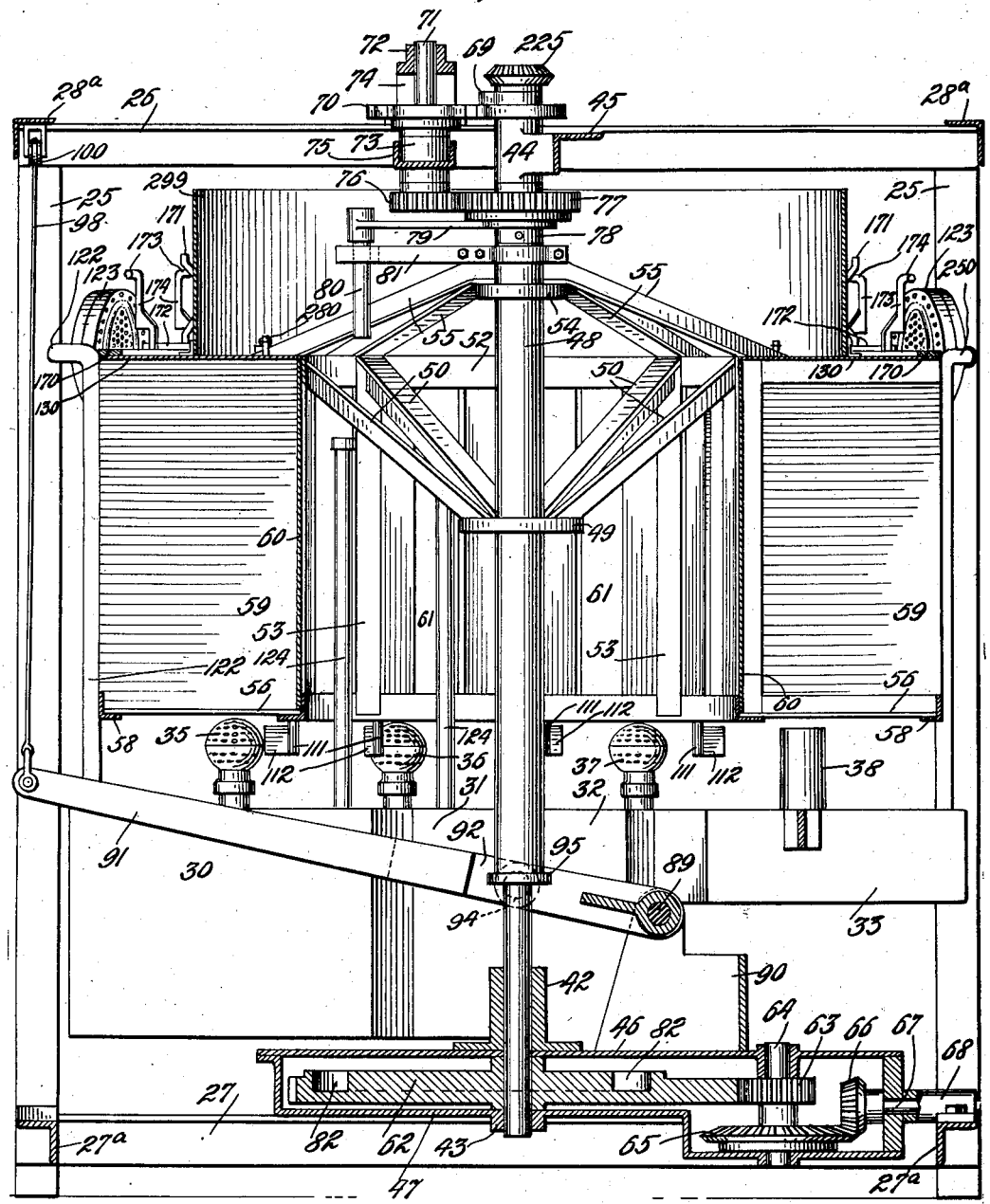

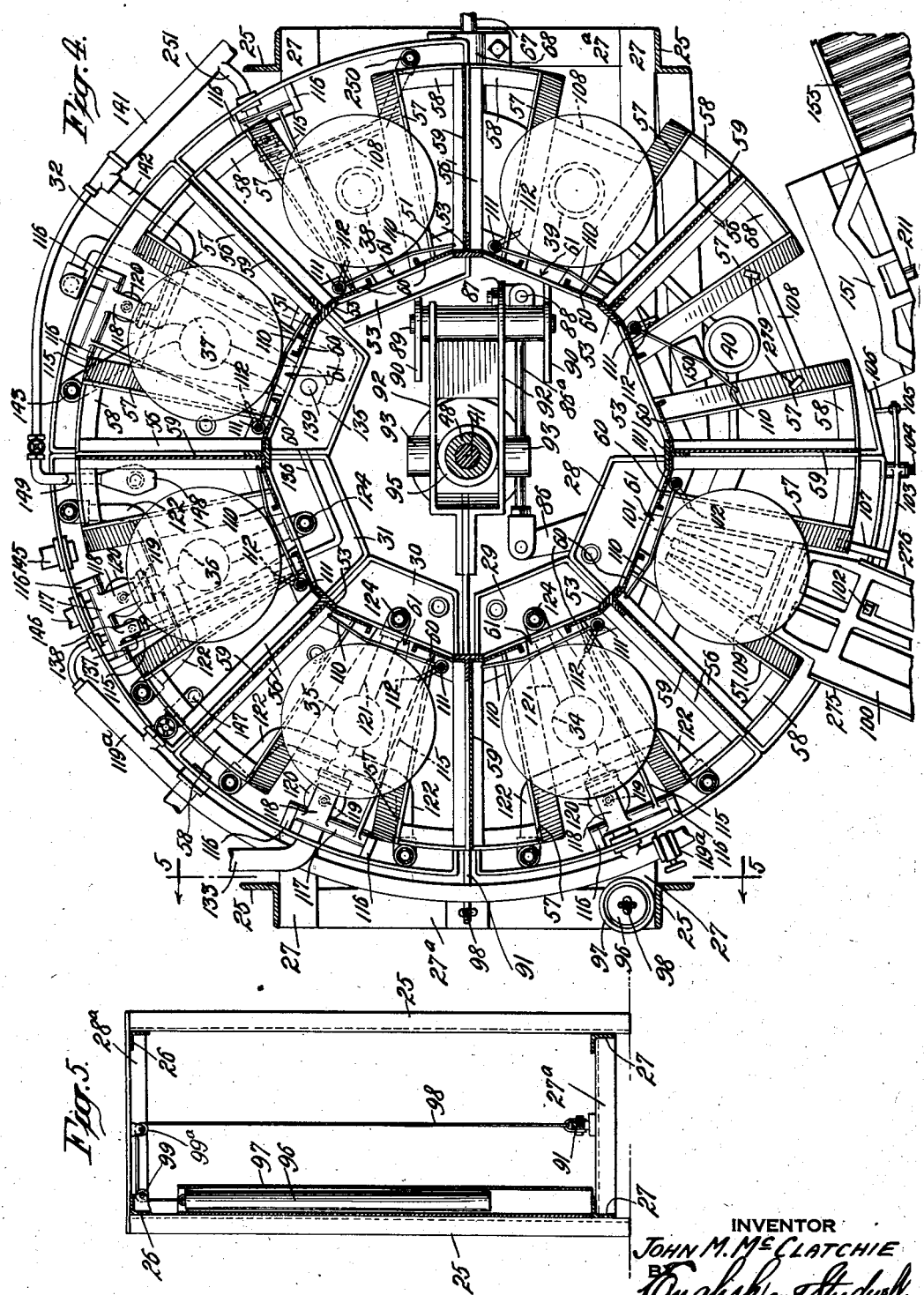

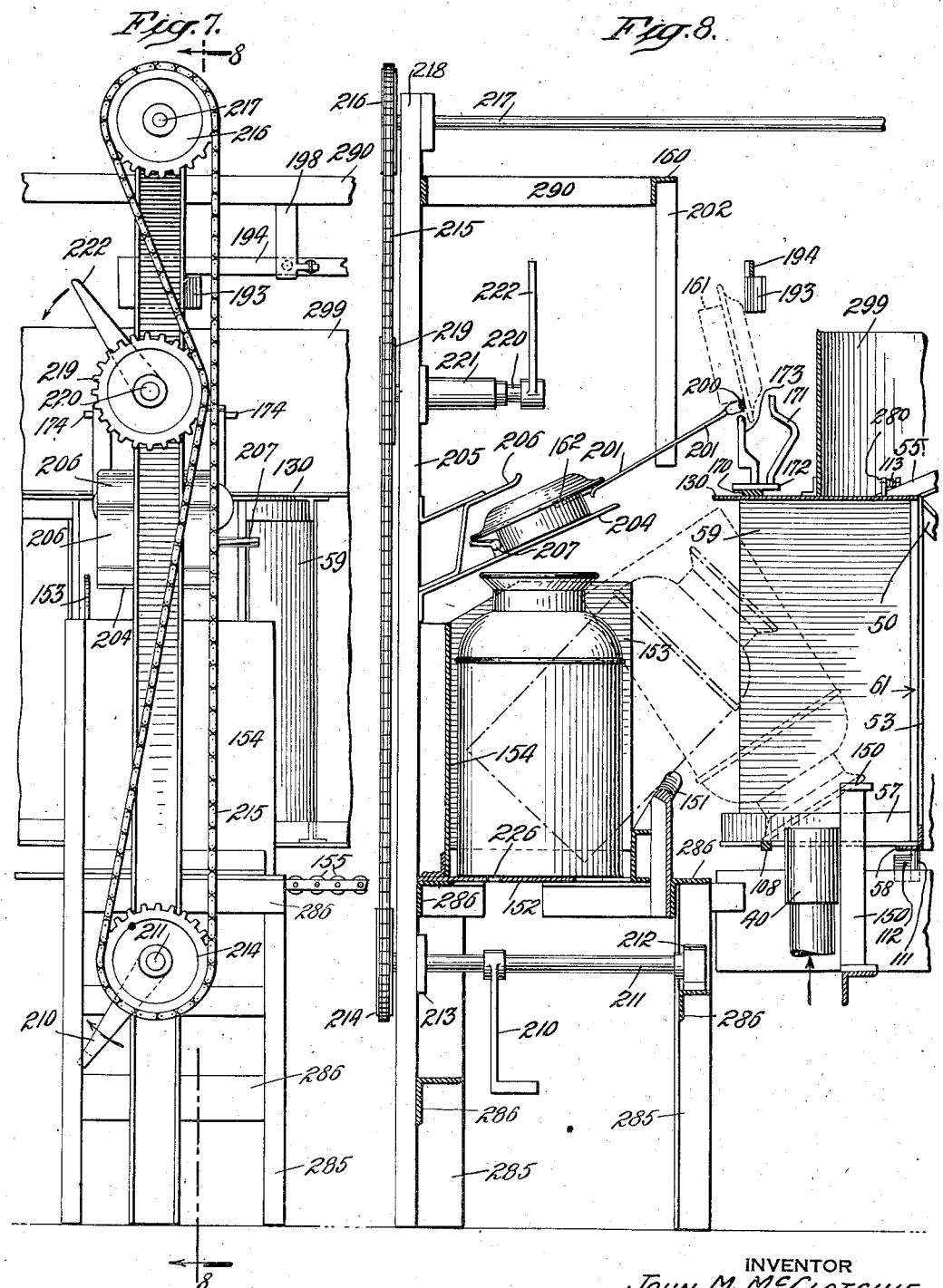

Sept. 15, 1936. J. M. McCLATCHIE 2,054,293
APPARATUS FOR WASHING CANS AND THE LIKE
Filed Feb. 21, 1934 12 Sheets-Sheet 7
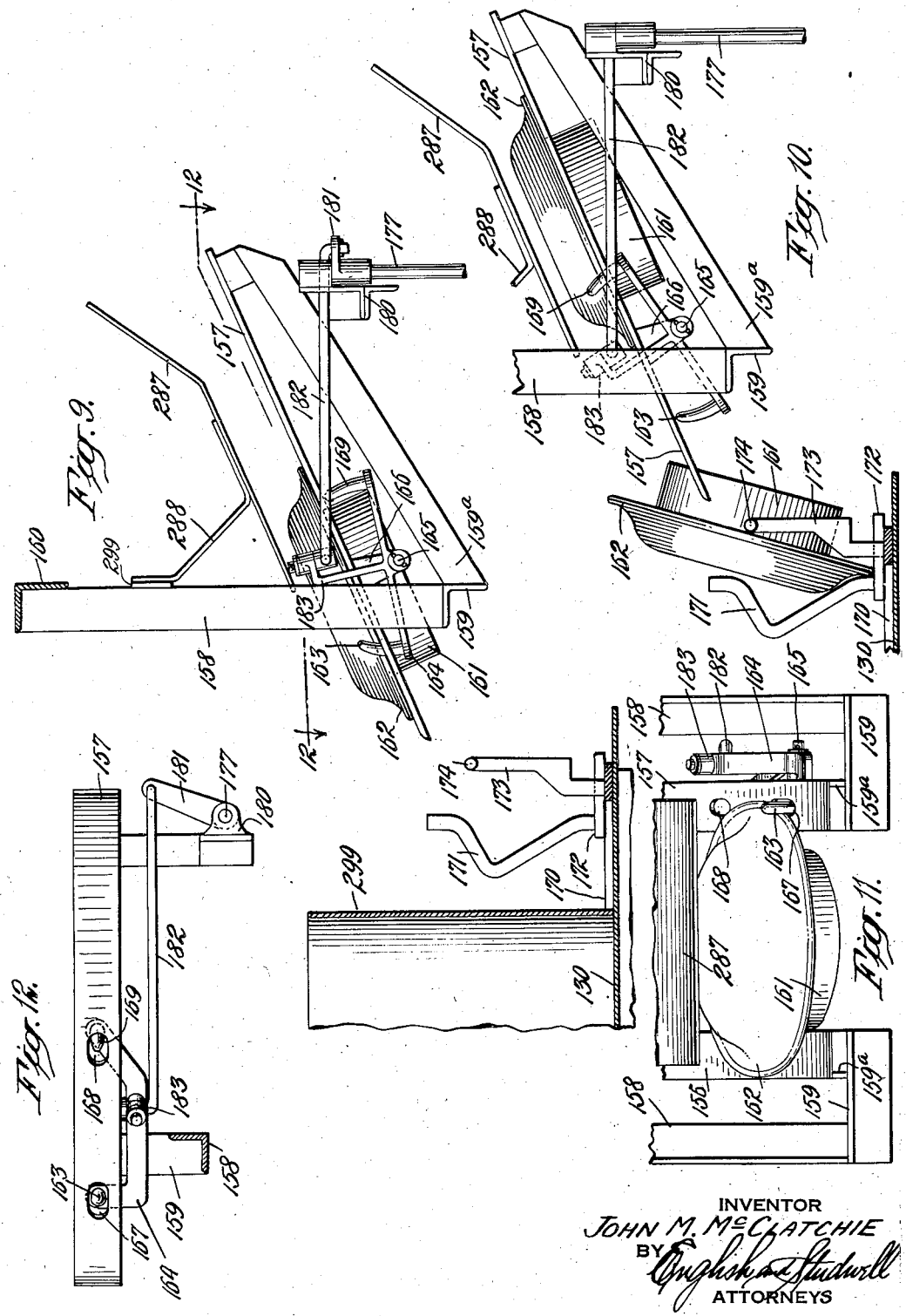
INVENTOR
JOHN M. McCLATCHIE
BY
ATTORNEYS

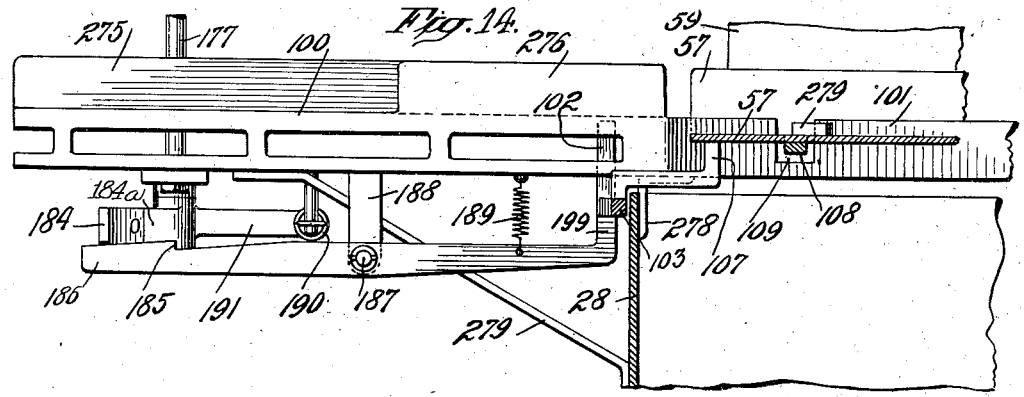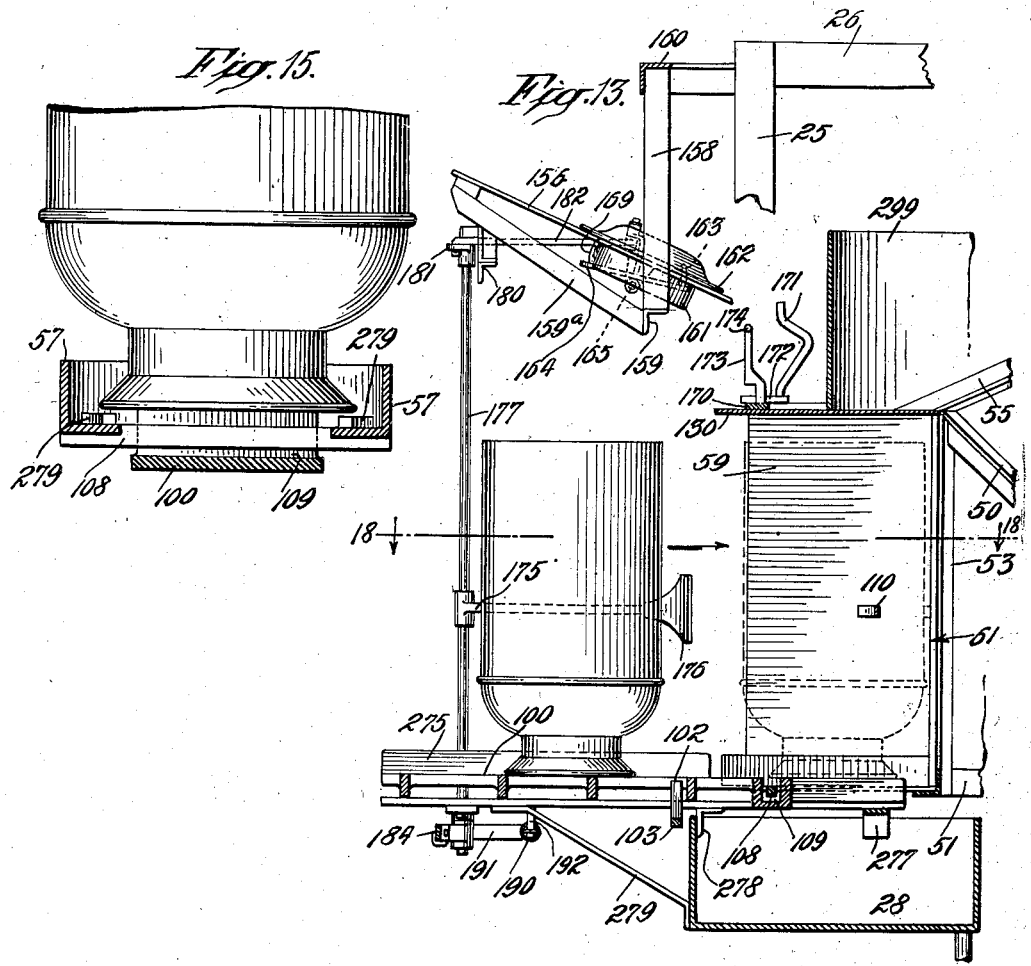

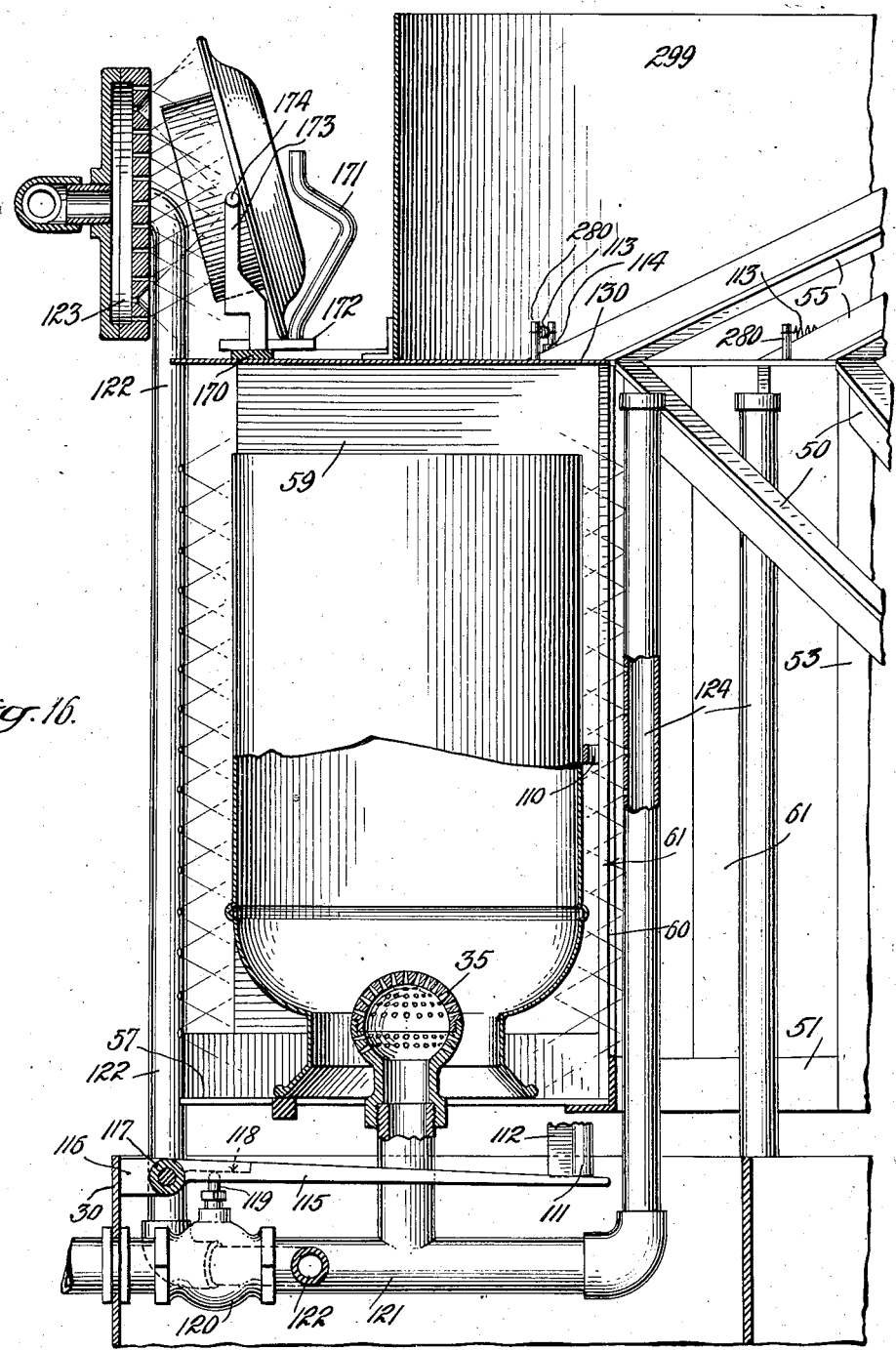

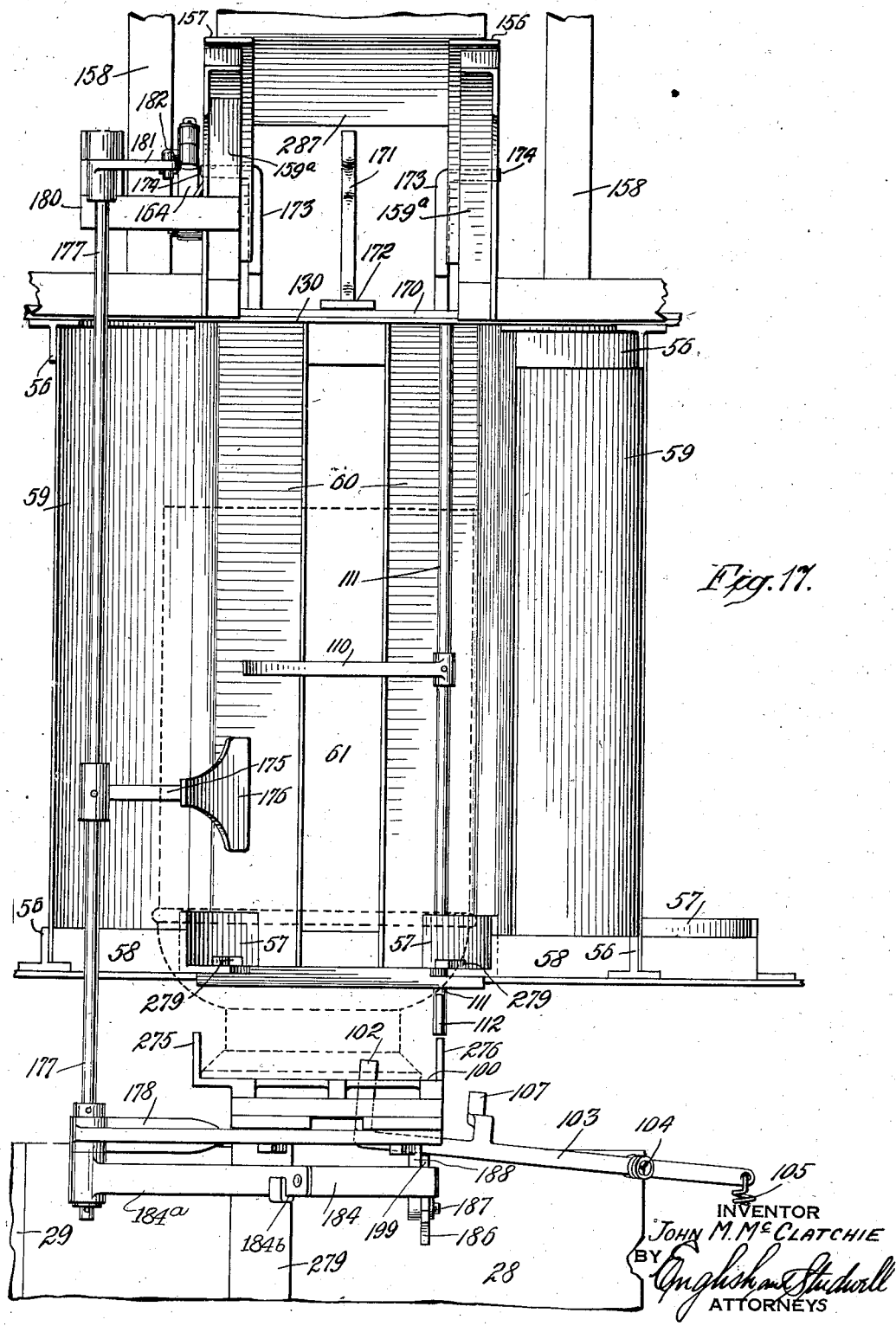

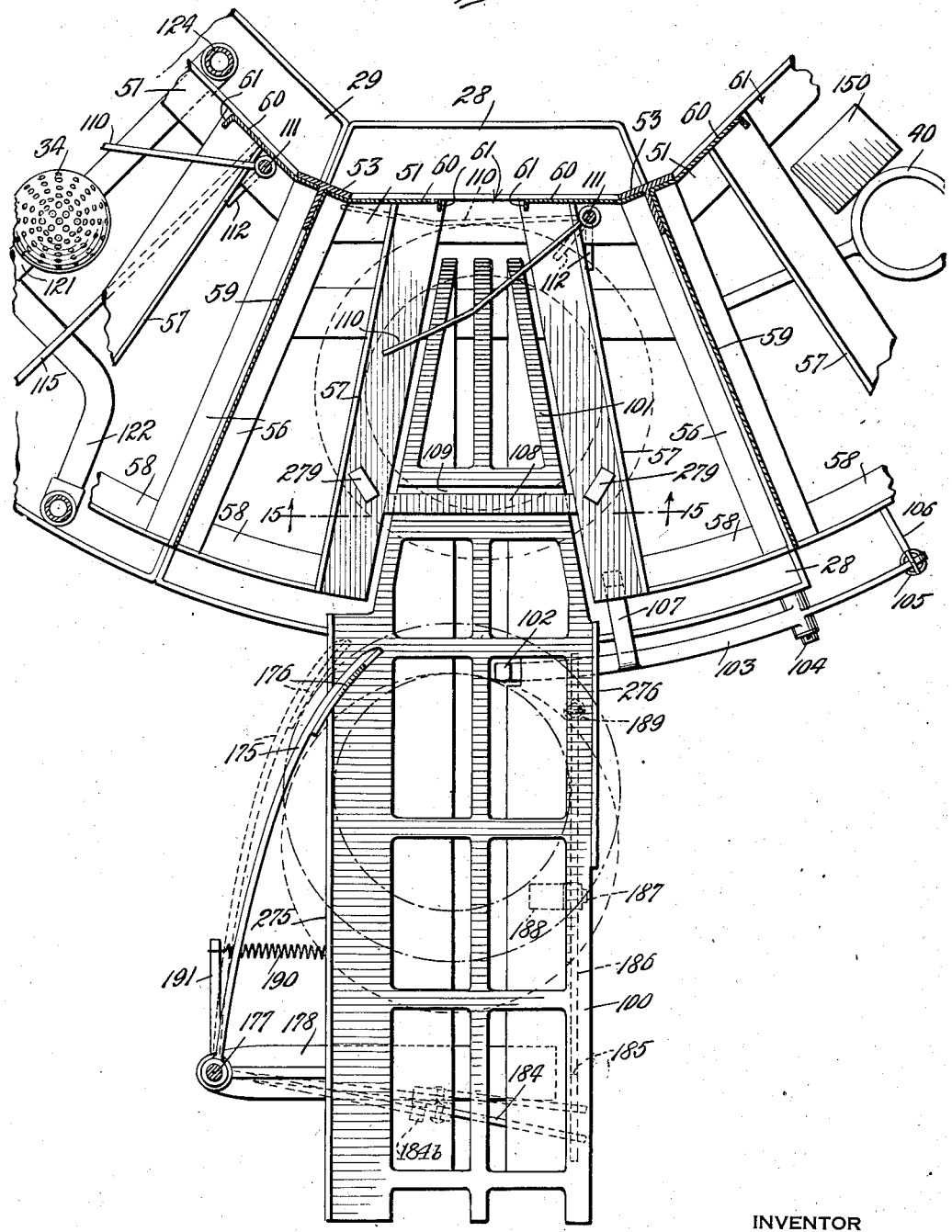

Sept. 15, 1936. J. M. McCLATCHIE 2,054,293
APPARATUS FOR WASHING CANS AND THE LIKE
Filed Feb. 21, 1934 12 Sheets-Sheet 12
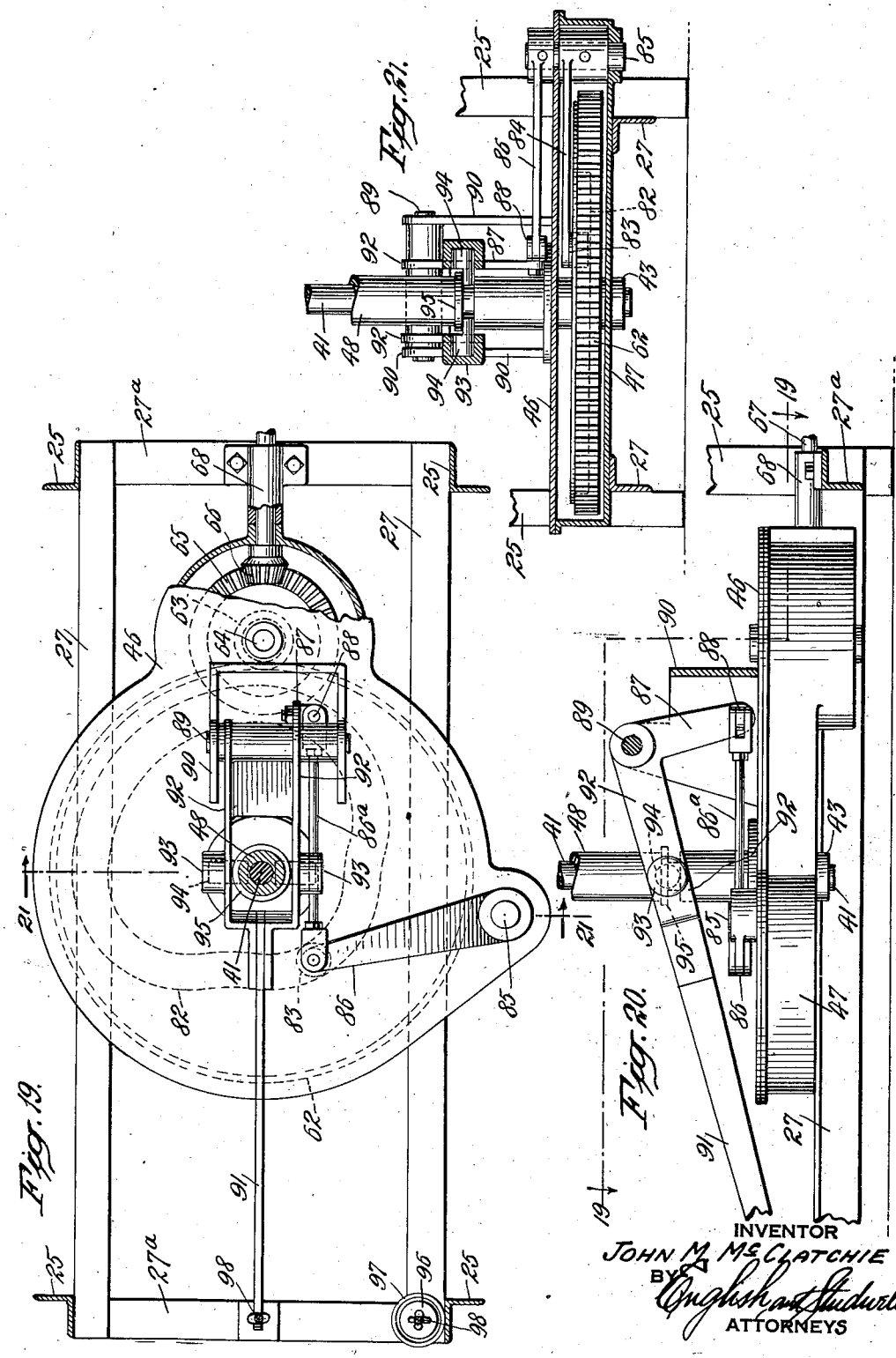
INVENTOR
JOHN M. McCLATCHIE
BY
ATTORNEYS Patented Sept. 15, 1936

2,054,293

UNITED STATES PATENT OFFICE 2,054,293

APPARATUS FOR WASHING CANS AND THE LIKE

John M. McClatchie, New York, N. Y., assignor to The Borden Company, New York, N. Y., a corporation of New Jersey Application February 21, 1934, Serial No. 712,296

20 Claims. (Cl. 141—7)

The invention relates to an improvement in machines for washing cans and the like, and more particularly to an improvement in machines for washing, sterilizing and drying the relatively large cans used for transporting fresh milk from the point of production to the receiving and treating stations.

Can washing machines are usually of two general types: a longitudinal type in which a can transporting carriage moves longitudinally to present the cans to the can cleansing elements, which are arranged in a straight line; and a rotary type in which the can transporting carriage travels in a circular path to present the cans to the can cleansing elements, which are arranged in a circle.

The general object of the invention is to produce a can washing machine of the rotary type which is cheaper to build and operate, is smaller, more compact and composed of fewer parts, and is more efficient and durable than such can washing machines as heretofore constructed or proposed.

In the machine of the present invention there is provided a rotary carriage or turntable which carries a number of cans in inverted position and holds them successively over each of a series of nozzles which subject the cans to cleansing treatments. The rotary carriage is moved with a vertical movement as well as with an intermittent rotary movement, so that it lifts a can from position over one nozzle, then by a rotary movement conveys the can to position above the next nozzle and then descends to lower the can so that the nozzle above which it is situated projects into the can and directs the cleansing fluid thereinto. By this cycle of operations, each can is carried from one nozzle to the next and after the cleansing treatments are completed, the can is ejected, right side up, from the machine.

The invention also includes the provision of means for subjecting the can covers to cleansing treatments similar to those received by the cans and simultaneously with the cans so that when each can is ejected from the machine, its cover will also be ejected and will fall into the mouth of the ejected can and be carried away thereby.

A novel feature of the invention consists in the means which directs each cover into a rack located on the can carriage above the compartment in which the can to which the cover belongs is positioned. The rack holds the covers in position to be treated by fluids directed from nozzles operated simultaneously with the can-treating nozzles.

Another novel feature of the invention resides in the means by which the covers are ejected from the can carriage and then directed into the mouths of their corresponding cans as they leave the machine.

The present invention comprises other novel features, the advantages of which will be pointed out as the description proceeds, the improved machine of the invention being fully described hereinafter and the novel features thereof being particularly pointed out in the appended claims.

Figure 6:
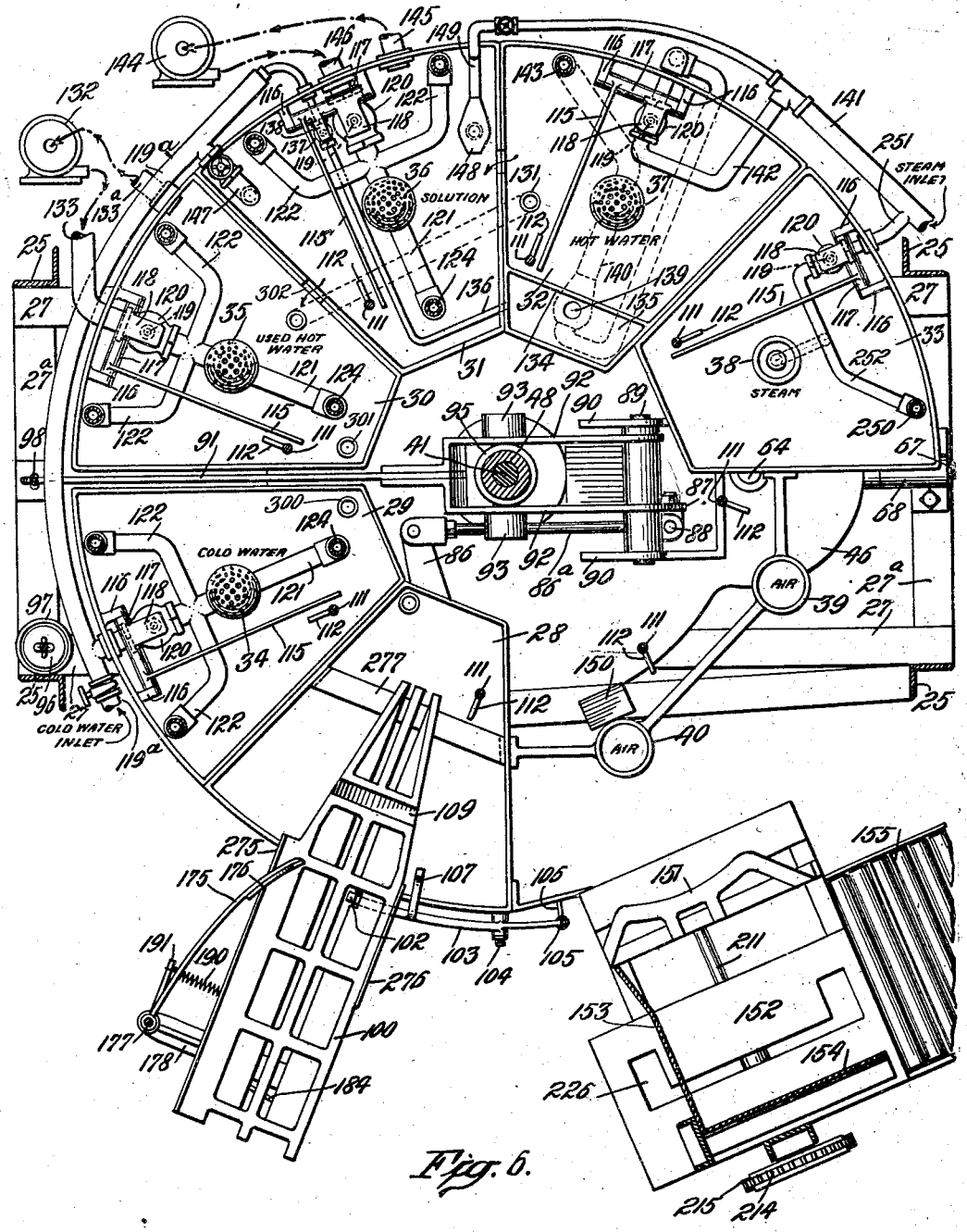

In the accompanying drawings illustrating the preferred form of the invention, Fig. 1 is a plan view of the machine; Fig. 2 is a sectional view taken on the line 2—2 of Fig. 1, looking in the direction of the arrows; Fig. 3 is a view similar to Fig. 2, but showing the can carriage or turntable in its raised position; Fig. 4 is a sectional view taken on the line 4—4 of Fig. 2, looking in the direction of the arrows; Fig. 5 is a sectional view on the line 5—5 of Fig. 4, but drawn to a smaller scale; Fig. 6 is a horizontal sectional view through the machine below the can carriage, taken substantially on the line 6—6 of Fig. 2, looking in the direction of the arrows; Fig. 7 is a front elevation of the mechanism for discharging the cleansed cans and covers from the machine; Fig. 8 is a sectional view on the line 8—8 of Fig. 7, looking in the direction of the arrows; Figs. 9 and 10 are side elevations of the mechanism for delivering can covers to the racks on the can carriage, Fig. 9 illustrating the manner in which a cover is held on the delivery chute preparatory to being deposited in one of the racks, and Fig. 10 showing the cover deposited in one of the racks and a second cover on the chute; Fig. 11 is a front elevation of the cover-delivery means illustrated in Figs. 9 and 10; Fig. 12 is a sectional view taken substantially on the line 12—12 of Fig. 9, looking in the direction of the arrows; Fig. 13 is a sectional view taken on the line 13—13 of Fig. 1, looking in the direction of the arrows; Fig. 14 is a side elevation of the entrance platform with adjacent parts of the machine shown in section; Fig. 15 is a sectional view through a part of the entrance platform and the carriage, showing how a can is supported on the inner end of the entrance platform, preparatory to being lifted by the carriage, the view being taken on the line 15—15 of Fig. 18, looking in the direction of the arrows; Fig. 16 is a vertical sectional view through a part of the carriage and associated parts of the machine, showing a can in position over one of the nozzles and being subjected to exterior and interior cleansing treatment; Fig. 17 is a front elevation of the portion of the machine at the entrance platform; Fig. 18 is a horizontal sectional view taken on the line 18—18 of Fig. 13; Fig. 19 is a horizontal sectional view of the mechanism for raising and lowering the can carriage, the section being taken on the line 19—19 of Fig. 20; Fig. 20 is a side elevation of the structure shown in Fig. 19; and Fig. 21 is a sectional view taken on the line 21—21 of Fig. 19, looking in the direction of the arrows.

The improved can-washing machine is provided with a stationary frame comprising the four uprights 25, connected at their upper ends by two spaced horizontal bars 26 and near their lower ends by the horizontal bars 27. The frame thus formed is braced at its lower end by cross members 27a which connect the uprights 25, as shown in Fig. 4, and at its upper end by cross braces 28a which connect the upper ends of the uprights 25, as seen in Fig. 1. Supported at the lower part of the frame are tanks 28, 29, 30, 31, 32 and 33 over each of which (with the exception of the tank 28, which is merely a drip pan) is located a nozzle for subjecting the interior of a can held over it by the can carriage, to a cleansing treatment. The first nozzle to which a can is presented is shown at 34, and it subjects the can to a cold water rinse. The second nozzle 35 rinses the interior of the can with hot water; the third nozzle 36 directs a cleansing solution against the inner surfaces of the can; and the fourth nozzle 37 washes the inner surfaces of the can with clean hot water. Nozzle 38 subjects the interior of the can to a steam bath and nozzles 39 and 40 direct a stream of cold air into the can to dry it. While these nozzles are cleaning the interior surfaces of the cans, jets located adjacent to the nozzles 34, 35, and 36 clean the outside surfaces of the cans, and another series of nozzles shown at 123 (Fig. 1) cleanse the can covers carried by the can carriage in company with the cans.

The can carriage or turn-table, which is rotated clockwise when viewed in plan and which carries the cans successively from one nozzle to the next, is raised and lowered vertically and is also intermittently rotated about a centrally located vertical shaft 41 having its lower end mounted in bearings 42 and 43 and its upper end mounted in a bearing 44 which is formed on or secured to a cross-piece 45 connecting the two spaced upper frame members 26, as shown in Fig. 1. The lower bearing 42 is secured on top of the upper cover plate 46 of a gear casing within which some of the mechanism for imparting the vertical movement to the carriage is located. Bearing 43 is formed on the lower plate or body 47 (Fig. 20) of the casing, which is supported upon the two lower cross bars 27 of the machine frame.

A sleeve 48 forming the central part of the can carriage is mounted to move vertically and rotatably on the shaft 41. The sleeve is provided with a collar 49 from which a plurality of brace members 50 radiate. At their outer ends, these radial braces 50 connect with an octagonally shaped frame or cage composed of eight lower angle bars 51, eight upper angle bars 52 and eight connecting vertical braces 53. Near its upper end the sleeve 48 is provided with a collar 54 from which extend radial braces 55 connecting the sleeve with the cage composed of the elements 51, 52 and 53.

Extending radially from the upper and lower carriage frame members 51 and 52 are horizontal angle irons 56. From the lower frame members 51 angle irons 57, forming the can supports, also project radially. The ends of the members 57 are connected to the ends of the lower members 51 by the pieces 58 (Fig. 18). Through this arrangement an octagonal carriage frame is provided which is divided into eight can compartments, each of which receives and supports a can on the pair of angle irons 57 located in that compartment, and carries it from one nozzle to the next.

The can compartments are separated by side plates 59 and fitted with a back plate 60 provided with a middle vertical opening 61 through which cleansing fluids can be sprayed against the outside of the can when it is positioned over one of the nozzles 34, 35 and 36. A top plate 130 extends over and covers the tops of all of the can compartments.

The can carriage or turn-table is driven with an intermittent rotary movement from the vertical shaft 41 which is provided at its lower end with a large gear 62 located within the gear casing composed of the casing elements 46 and 47. Gear 62 is driven by a pinion 63 secured on a shaft 64 rotatably mounted in the gear casing and carrying a bevel gear 65 which meshes with another bevel gear 66 secured on a shaft 67 mounted in the bearing 68 secured on one of the lower frame braces 27a. The shaft 67 is driven by a motor or other suitable source of power. At its upper end, the vertical shaft 41 carries an arm 69 (of a Geneva movement) provided with a roller on its end arranged to enter the slots of a wheel 70 which is secured upon a short shaft 71 rotatably mounted in bearings 72 and 73 supported on cross-pieces 74 and 75 supported on the top bars 26 of the machine frame. The shaft 71 carries a gear 76 which meshes with a gear 77 free on the vertical shaft 41 and supported thereon by the collar 78 pinned to the shaft 41. Secured to the gear 77 is an arm 79 provided at its outer end with a downwardly projecting pin 80 located in the slotted end of a fork 81 secured at the upper end of the sleeve 48. Through this drive mechanism it will be apparent that the carriage is intermittently rotated to locate cans carried by it in vertical alignment with the nozzles during pauses in the rotative movement of the carriage. The rotation of the can carriage occurs only when the carriage is in its elevated position, in which position the carriage is raised clear of the nozzles, as shown in Fig. 3. During the descent of the carriage and while the cans are over the nozzles during the injection of cleansing fluids into the cans, no rotary movement of the carriage occurs.

The large gear 62 operates the mechanism for raising and lowering the can carriage, such mechanism being shown in detail in Figs. 19 to 21. The gear 62 is provided with a cam groove 82 in which a roll 83 on the end of an arm 84 (Fig. 21) is located. Arm 84 is secured on a pivot pin 85 journalled in the gear casing elements 46 and 47 and another arm 86 positioned over the arm 84 is secured on the pivot pin 85 above the gear casing cover 46. The end of the arm 86 is pivotally connected to one end of a link 86a which has its opposite end connected by a toggle joint 88 with the short, downwardly extending arm 87 of a bell-crank lever. This bell-crank lever is pivoted at 89 in a U-shaped bracket 90 extending upwardly from the casing cover 46. The longer arm 91 of the bell-crank lever is provided with a yoke 92 which straddles the vertical shaft 41.

On each arm of the yoke is a boss 93 provided with an inwardly extending pin 94 flattened on the top of its inner end and arranged to project under the lower end 95 of the sleeve 48. As the roll 83 is moved to the left, viewing Fig. 19, by the action of the cam groove 82, the lever 86 acting through the link 86a, draws the arm 87 of the bell-crank lever to the left, causing the longer arm 91 thereof to be swung upwardly to lift the sleeve 48 and elevate the can carriage supported thereby. The can carriage is counterbalanced by a weight 96 so that it will rise and descend smoothly. This weight 96 is movable vertically in a guide tube 97 supported by the machine frame bars 25 and 27a, and is suspended from a cable 98 extending over pulleys 99 and 99a and connected with the end of the arm 91 of the bell-crank lever.

The cans are moved onto the can supporting bars 57 of the carriage from a stationary entrance platform 100, shown in detail in Figs. 6, 14 and 18. The platform is in the form of a grid to permit the drainage of any milk residue from the cans when they are manually placed in inverted position on the platform. In Fig. 13 is shown an inverted can on the platform in position to be pushed onto the can supports of the carriage.

The outer end of the platform is rectangularly shaped and is located outside of the machine, and the inner narrowed end of the platform extends into the machine and is located over the tank or drip pan 28. At its inner end the platform is supported on a cross member 277 extending across the tank 28, at an intermediate point by an angle iron 278 (Fig. 13) attached at one edge of the tank, and at its outer end by the brace 279 extending outwardly from the tank 28. The outer part of the platform has a guard flange 275 extending along one of its longitudinal edges and a shorter guard flange 276 extending along a part of the inner end of its opposite edge. These flanges serve to guide the cans, manually placed on the platform, toward the inner narrowed or tapered end 101 of the platform. During each pause in the intermittent rotary movement of the carriage, and while the carriage is in its lowered position, the inner end 101 of the platform is located in the space between a pair of bars 57 in one of the can compartments of the carriage, as shown in Fig. 18. These two bars 57 in each of the can compartments support a can on their horizontal webs, the bars 57 lifting the can from the inner end of the platform and carrying it to position over the nozzles successively.

In placing a can on the carriage, the can is first stood in inverted position on the outer end of the platform and slid inwardly toward the carriage, or in the direction of the arrow in Fig. 13. If the carriage is in its raised position when the can is slid along the platform, the edge of the mouth of the can will strike a stop member 102 projecting upwardly through the platform. The stop 102 is the upwardly-extending end of a lever 103 pivoted at 104 on the tank 28. The other end of the lever is connected to a spring 105 fastened to a pin 106. When the stop is projecting upwardly through the platform it prevents farther sliding movement of the can toward the carriage until the carriage descends and reaches its lowered position in readiness to receive a can from the platform. One of the can supports 57 then strikes an off-set arm 107 extending inwardly from the lever 103 thereby forcing the stop 102 downward below the platform so that the can resting thereon can then be slid inwardly along the platform until it reaches a position on the narrowed end 101 thereof, as shown in dotted lines in Figs. 13 and 18. In this position the mouth of the can will be over one pair of can supports 57 of the carriage, but not actually on them, because when the carriage reaches its lowest position of descent, the supports 57 are below the upper face of the inner end of the platform. This will be clear from Figs. 13 and 15 where the can is shown resting on the inner portion 101 of the platform with the can supports 57 located below the mouth of the can. Each pair of can supports 57 is connected by a cross brace 108 which cooperates with the supports 57 in carrying the can and which on the descent of the carriage enters into a transverse groove 109 in the upper face of the platform. When the carriage rises, the can supports 57 and cross brace 108 rise against the mouth of the can and lift the can from the inner end of the platform. Blocks 279 on the upper face of the horizontal webs of the supports 57 are arranged to engage the edge of the mouth of the can and prevent the can from shifting on the supports. When the carriage reaches the limit of its upward movement, it is rotated sufficiently to locate the can carried by it above the first nozzle 34, and it then descends until the nozzle projects within the can, so that the cold water issuing from the nozzle will spray the interior surfaces of the can.

When the can is slid along the platform 100 toward the carriage preparatory to being delivered thereto, the forward side of the can strikes an arm 110 secured on and projecting from a vertical shaft 111 located in each can compartment and pivoted in the plate 130 and in the frame carriage members 51. The lower end of the shaft projects below the can supports 57 and is provided with a laterally extending wing 112 arranged to be so positioned that when a can is on the carriage, the wing 112 will effect the opening of the valve for controlling the passage of fluid to the nozzle over which the can is located. The wing 112 is normally held in inoperative position by means of a spring 113 attached at one end to an arm 114 fixed on the upper end of the shaft 111, and at its other end to a pin 280 projecting from the top plate 130 of the carriage. As a can is pushed to position over the supports 57, the contact of the can with the arm 110 will rotate shaft 111 from the position shown in full lines in Fig. 18 to that shown in dotted lines, and as long as the can remains in its compartment on the carriage, the valve-actuating wing 112 will remain in operative position. In this position, the wing 112 will, during pauses in the rotary movement of the carriage, be located over the end of an arm 115 projecting inwardly from a hub 117 pivoted in lugs 116 on the outer wall of each of the tanks 29 to 33, inclusive. The hub 117 from which the arm 115 projects is also provided with an inwardly projecting lug 118 located above the vertically operating stem 119 (Fig. 16) of a poppet valve 120 with which each of the several tanks is provided. The valves remain normally closed until the stems 119 are depressed by means of the lugs 118, which are forced downwardly when the arms 115 are depressed by the wings 112 on the descent of the can carriage.

Since a wing 112 located below a can compartment will be only in vertical alignment with an arm 115 when a can is in that compartment, it will be apparent that when a can is absent from a compartment, the valves controlling the nozzles over which the empty compartment is successively positioned, will not function, since the wing 112 will not be in position to operate the valves.

The valves of the three first nozzles 34, 35 and 36, are each located, respectively, in one of the horizontally arranged pipes 121 positioned in the upper part of the tanks 29, 30 and 31. The nozzle 34, over which the can is first positioned, directs against the inner surfaces of the can a spray of cold water received from a main 119a with which the first pipe 121 is connected. The main 119a may receive water under pressure from any source of supply. The water directed against the can falls into the tank 29 from which it is discharged through an outlet pipe 300 into a sewer or other convenient receptacle.

Each of the pipes 121 is provided with two upwardly extending branches 122 (Figs. 6 and 16 connected with one of the series of nozzles 123 which spray the inside of the can covers simultaneously with the spraying of the cans. The inner sides of the vertical portions of the branch pipes 122 are provided with a line of perforations, as shown in Fig. 16, to direct diverging sprays of cleansing fluid against the outer surfaces of the cans. Each pipe 121 is also provided at its inner end with a vertically-extending perforated pipe 124 which directs its spray through the slot 61 in the rear plate of the can compartment against the inner face of the outside of the can. The cylindrical outside of the can being thus sprayed from three points is thoroughly cleansed. The drip water from the outside of the can over nozzle 34 also falls into tank 29 and goes to waste through opening 300.

After the can has been given the preliminary rinse by the nozzle 34 it is carried upward, and then by a rotary movement of the carriage is brought to position above the next nozzle 35. The carriage then descends to cause the nozzle 35 to project into the can. Nozzle 35 and the spray pipes 122 and 124 associated therewith direct hot water against the inner and outer surfaces of the can, the supply of hot water for this nozzle and its associated spray pipes being received from the tank 32 through the overflow pipe 131. The hot water is forced through the nozzle 35 and pipes 122 and 124 by a pump 132 diagrammatically illustrated in Fig. 6, which is connected with the pipe 121 in tank 30 by pipe 133. The pump receives the water from tank 30 through the pipe 133a. The drip water falling into the tank 30 from the can over nozzle 35 passes to waste through the overflow pipe 301.

The can is next transported to a position over the nozzle 36 which sprays the inner surfaces of the can with streams of solution drawn from the tank 31 by means of a pump 144 diagrammatically shown in Fig. 6. The intake of the pump is connected with the lower part of the tank 31 through the pipe 145. The outlet of pump 144 is connected with the nozzle 36 through the pipe 146 which is an outer extension of the pipe 121 in tank 31. While the nozzle 36 is spraying the inner surfaces of the can with solution the outer surfaces are also sprayed with solution by the pipes 122 and 124 associated with nozzle 36. In making up the solution in tank 31 at the beginning of the day's run, water may be admitted into the tank from the main 119a through the valve-controlled pipe 147 connected therewith, and from time to time during the day, the supply of solution in the tank 31 is replenished so that the strength of the solution used is relatively uniform. The solution in the tank 31 is heated by a steam nozzle 148 connected to a steam main 141 by the pipe 149. The drippings from the inner and outer surfaces of the can over nozzle 36 fall into tank 31 to be used over again. To prevent the tank 31 from overflowing it is provided with the hole 302 leading into tank 30.

The can is next carried to position over the nozzle 37 from which it receives an internal hot water rinse. Hot water is supplied to the nozzle 37 by heating clean cold water which is intermittently supplied through a pipe 136 to a supplemental chamber 135 located in the tank 32 and formed by the partition 134. The pipe 136 is connected through a valve 137 with the cold water main 119a. Valve 137 is located in the tank 31 and is operated by a lug 138 projecting from the hub 117 of the valve-operating device for the valve 120 located in that tank. Each time the valve-operating mechanism for the nozzle 36 is operated, a supply of cold water is delivered into the compartment 135 and is heated and discharged through the nozzle 37 against the inner surfaces of the can. The hot water discharged through the nozzle 37 is caught in the tank 32 and flows through the pipe 131 into tank 30. The cold water delivered into the compartment 135 by the pipe 136 is heated by being drawn through the outlet 139 into the pipe 140 into which live steam is fed from the steam pipe 141 having a branch 142 connecting with pipe 140 through the valve 120. The nozzle 37 is connected with the pipe 140, as is a vertical pipe 143 which has its upper end connected with one of the cover-spraying nozzles 123, as clearly shown in Fig. 1.

The nozzle 38 subjects the inner surfaces of the can to the action of live steam to kill any deleterious micro-organisms adhering thereto. Nozzle 38 receives steam from the steam supply pipe 141 through the pipes 251 and 252, with which latter pipe it is connected under the tank 45 or drip pan 33, and is controlled by its respective valve 120. To the pipe section 252 is connected the lower end of an upright pipe 250 connected at its upper end to a cover cleansing unit 123.

The nozzles 39 and 40 direct a blast of air into the can. Neither of these nozzles is controlled by a valve. A blower or other source of continuous air blast causes a stream of air to issue from the nozzles to rapidly and effectively dry the can as it is brought down over them.

On the descent of the carriage to position the can over the second air nozzle 40, one side of the mouth of the can is brought into contact with the upper end of a fixed projection or post 150 located behind and rising higher than the nozzle 40. As the descending can strikes this projection it is caused to tilt or incline outwardly away from the carriage and to fall against an abutment 151 having a curved upper end over which the can somersaults to land upright, with its mouth uppermost, upon the discharge platform 152, as shown in Fig. 8. The discharge platform 152 is supported on a frame composed of four short uprights or legs 285 braced by horizontal angle-irons 286. To prevent toppling of the can as it strikes the platform, guard plates 153 and 154 are provided along two sides of the platform. After the can comes to rest in uprighted position on the platform it receives its cover, and is there pushed (by means to be described) onto the rolls 155 by which it is carried from the machine.

While the cans are undergoing the washing, sterilizing and drying operations, the covers for the cans are subjected to similar treatments. The covers are fed to racks located on top of the can carriage by being manually placed on a chute, consisting mainly of a pair of spaced, inclined rails 156 and 157, supported by a fixed frame composed of upright angle irons 158, horizontal angle irons 159 and inclined bars 159a, (Figs. 9 to 13), said frame being carried from an upper bar 160 which extends out from the upper bars 28a of the stationary frame of the machine. The rails 156 and 157 extend downwardly at an oblique angle toward the can carriage and are so spaced that the cylindrical neck portion 161 of a can cover is received between them, and the flanged top portion 162 of the cover rests on the rails. A guide plate 287 (Figs. 9 and 10) supported by brackets 288 extending from a cross bar 299 connecting the vertical bars 158, prevents the covers from rising from the rails 156 and 157. When a can is placed on the platform 100, a cover is placed on the rails 156 and 157 and it slides downwardly thereon until it is held by a finger 163 projecting upwardly from one end of a rocking lever 164 which is centrally pivoted at 165 in a bracket 166 extending downwardly from the rail 157. The rail 157 is provided with two spaced apertures 167 and 168, that shown at 167 being adapted to permit the passage of the finger 163 through it to enable the finger to engage the edge of the flange 162 of the cover and prevent the cover from sliding off the ends of the rails 156 and 157. Aperture 168 permits the upward projection of a second finger 169 located at the other end of the rocking lever 164. At the proper time, the rocking lever 164 is swung on its pivot, to lower finger 163 out of the path of the cover, permitting the cover to slide from the rails 156 and 157 and fall into a holder or rack mounted on a strip 170 located on the top plate 130 of the carriage.

Each rack consists of an inner, upwardly projecting, bent rod 171 secured to a base plate 172, and a pair of spaced side members 173 having laterally extended upper ends 174 against which the inner surfaces of the cover flange 162 rest when a cover is supported in the rack. The shapes of the cooperating cover-holder elements 171 are such that each cover when received in the rack will rest on its edge and will lean or tilt slightly, as shown in Fig. 16, in an outward direction or toward the cover-treating nozzles with which it is brought into alignment on descent of the carriage.

When the finger 163 on the lever 164 is moved down through the aperture 167, the other finger 169 is moved upward through the aperture 168 into position to engage the front edge of the next cover on the chute and prevent its farther descent until the next rise of the carriage.

A rack or holder for a cover is situated over each of the can compartments on the carriage so that as each can is transported by the carriage, it is accompanied by a cover located in the rack above the can. As the carriage descends to place the cans over the nozzles, the covers located in the racks are brought into horizontal alignment with the cover-cleansing nozzles 123, as shown in Fig. 16, so that a can and its cover are always simultaneously cleansed by the streams from the respective can and cover treating nozzles.

The delivery of the can covers to the racks is controlled by the cans as the cans are slid along the platform 100 on their way to the inner end 101 of the platform to be lifted therefrom by the can carriage. When a can is first placed on the platform preparatory to being slid inwardly toward the carriage, a cover is placed on the rails 156 and 157 and the cover will slide downwardly to the position shown in Fig. 9 with its flange 162 engaged by the finger 163. As the can is moved inwardly toward the carriage, the front side of the can comes into contact with a plate 176 secured on the free end of an arm 175 projecting from a vertical shaft 177 journalled at its lower end in a bracket 178 (Fig. 17) secured to the under side of the platform 100, and at its upper end in a bearing 180 extending from one of the diagonal brace members 159a. As the can strikes against the plate 176 and swings the arm 175, the beginning of such movement being indicated in dotted lines in Fig. 18, the turning of the shaft 177 causes an arm 181, secured on the upper end of the shaft 177, to be swung inwardly, or to the left when viewed as in Figs. 9 and 12. The free end of the arm 181 is connected with one end of a link 182 the other end of which is pivotally connected to the upper end of an arm 183 projecting upwardly from the lever 164. Through this arrangement, the can pushed along the platform to a position on its inner end, causes the cover-holding finger 163 to be moved downwardly out of the aperture 167 so that the cover held thereby, as shown in Fig. 9, will be freed and will drop into the rack located above the compartment on the carriage into which the can has been moved.

The lower end of the shaft 177 carries an arm 184, pivotally connected with the part 184a fixed on the lower end of the shaft 177. The outer end portion of the arm 184 is adapted to engage with a shoulder 185 (Fig. 14) formed on the outer end of a lever 186 pivoted at 187 in a lug 188 extending downwardly from the platform. The inner end 199 of the lever 186 is upturned and bears against the under side of the stop lever 103 against which it is pulled by a spring 189 which has one end secured to the lever 186 and its other end secured to the platform. This arrangement is such that when the arm 175 is moved outwardly by the pressure of a can being slid along the entrance platform, the shaft 177 will swing the arm 184 to bring its end into interlock against the shoulder 185 on the part 186. Since the arm 184 is pivotally connected with the part 184a, the outer end of the arm 184 is raised by the outer end of the lever 186 when the inner end 199 thereof is depressed by the stop lever 103. The engagement of the arm 184 with the shoulder 185 serves to hold the finger 163 down out of the aperture 167 while the cover is sliding down along the rails 156 and 157 to reach its position in the rack, and the other stop finger 169 up through the slot 168. If another cover is placed on the rails 156 and 157 while the first cover is being delivered to a rack, the descent of the second cover will be stopped by the finger 169, as shown in Fig. 10, until the carriage conveys the first cover and its accompanying can away. When the carriage rises, thereby permitting the spring 189 to pull the inner end of the lever 186 upwardly, depressing the outer end thereof and so releasing the arm 184, the latter is held out of engagement with the notch 185 by the U-shaped stop 184b fixed on the inner end of the arm 184 and which engages with the under surface of the outer end of the part 184a.

As the carriage rises, the stop lever 103 under the pull of its spring 105, and the inner end of the lever 186 under the pull of the spring 189 are drawn upwardly, this action causing the free end of the lever 186 to be lowered to disengage the shoulder 185 from the arm 184. A spring 190 is secured at one of its ends to an arm 191 on the shaft 177 and at its other end to a pin 192 projecting downwardly from the platform 100. When the arm 184 is disengaged from the shoulder 185, the spring 190 returns the cover-feeding device to its initial position, this action causing the finger 169 to be lowered out of the aperture 168 so that the cover engaged by it is permitted to slide downwardly along the rails 156 and 157 until it is stopped by the finger 163 which is then extending upwardly through the aperture 167. When the next can is placed on the platform and is slid toward the carriage, it will strike the plate 176 on the arm 175 and the next can cover then held by the finger 163, will be released, permitting it to fall into the rack then positioned below the rails 156 and 157, in the manner just explained.

As a can is ejected from the carriage and uprights itself onto the discharge platform, the cover which was located in the rack above the compartment in which the can was located, is also ejected from the carriage. As the cover to be ejected from the carriage is being carried toward the discharge platform, while the carriage is in its elevated position and is being rotated, the top of the cover comes into contact with an angular end-piece or plate 193 located on the end of an arm 194 which is hinged at 195 on the frame member 25. The arm 194 is normally drawn toward the discharge platform by a spring 196, its movement toward the discharge platform being limited by a laterally extending pin 197 held in contact with an abutment 198 fixed to the frame member 160. As the carriage descends, the cylindrical portion 161 of the cover is brought to rest on a bar 200 connecting the upper ends of two rails 201 which are supported at the two ends of vertical struts 202 extending downwardly from the upper frame member 160. As the carriage continues its descent, the cover, left with its cylindrical portion resting on the bar 200, is tilted outwardly by the pressure of the plate 193 under the impulse of the spring 196 and falls toward the rails 201 which are spaced sufficiently apart to receive the cylindrical portion of the cover between them. The flange 162 of the cover resting on these rails, permits the cover to slide down and come to rest on an inclined supporting plate 204 extending inwardly from a fixed upright 205. An upper guide plate 206 serves to guide the cover to its proper position of rest on the supporting plate 204, the cover being brought to a stop on the support 204 by the rounded edge of a stop plate 207 against which the cylindrical portion of the cover abuts, as shown in Fig. 8.

The vertical frame upright 205 is secured near its lower end to the discharge platform frame braces 286 and at its upper end it is rigidly braced from the frame member 160 by diagonally extending braces 290.

As a cleansed can is moved laterally on the platform toward the rollers 155 to be carried away thereby, or to the right in Fig. 6, the cleansed cover resting on the plate 204 is slid sidewise from the plate so that it falls into the mouth of the can just as the can is moved onto the rollers 155. In this manner, the cleansed can and cover are carried away together. The can is moved laterally from the discharge platform and onto the rollers 155 by means of a rotating arm 210 (see Figs. 7 and 8) secured on a shaft 211 mounted to rotate in bearings 212 and 213 secured on the brace 286 and upright 205 respectively of the frame of the machine. Attached on one end of the shaft 211 is a sprocket 214 over which a drive chain 215 passes. The chain 215 also extends over an upper sprocket 216 secured on the end of a shaft 217 which is mounted at one end in a bearing 218 located at the upper end of the strut 205 and near its other end in a bearing 223 on the cross brace 45 (Fig. 1). The chain 215 also engages with a third sprocket 219 secured on a short shaft 220 mounted in a bearing 221 on the upright 205. At its inner end, the shaft 220 carries a cover-shifting arm 222 which is adapted to strike against and slide the covers from their position on the plate 204 to cause them to fall into the mouths of the cleansed cans as the cans are moved by the arm 210 from the discharge platform toward the rollers 155. The inner end of the shaft 217 carries a bevel gear 224 which meshes with another bevel gear 225 secured on the end of the vertical shaft 41. Through this arrangement, the vertical shaft 41 drives the shaft 217 which drives the chain 215 so that the arms 210 and 222 will simultaneously engage and move a cleansed can and a cleansed cover toward the rollers 155, the cover being pushed from the plate 204 by the arm 222 and falling into the mouth of the can so that the can carries the cover away with it.

To permit the can-shifting arm 210 to engage the side of a can resting on the discharge platform 152, the bottom of the platform is cut away or slotted at 226.

Briefly, the operation of the machine is as follows:

A can to be cleansed is placed on the entrance platform 100 by an attendant stationed at that point, but before the can is shoved into the machine the cover for the can is placed on the cover chute consisting of the rails 156 and 157. If there is no cover already on the rails, the cover placed thereon will slide down to the position shown in Fig. 9. If a cover is on the rails, it will be located in the position shown in Fig. 9, and the second cover placed on the rails will be located behind it. As the can is slid along the platform toward the can carriage, its mouth will strike against the stop 102 unless the carriage is in its lowered position and in readiness to receive the can. If the carriage is not in its lowered position, the attendant will make no effort to push the can past the stop 102 until the carriage descends. Upon its descent one of the can-supporting bars 57 will strike the off-set arm 107 of the stop lever 103 so that the stop 102 will be depressed out of the path of the can permitting the can to be slid in on the narrowed end 101 of the platform. As the can is moved past the arm 175, said arm will be swung to the left when viewed as in Fig. 18, this causing the rocking lever 164 to withdraw its finger 163 below the aperture 167 and permitting the cover restrained by the finger 163 to fall down into the rack over the compartment in which the can then on the inner end of the entrance platform is situated. When the can is moved toward the inner end 101 of the entrance platform, the side of the can contacts with the arm 110 and swings it toward the back of the can compartment to the position shown in dotted lines in Fig. 18, which moves the valve-operating wing 112 to operative position, as shown in dotted lines in Fig. 18. The can carriage, upon rising, lifts the can from the inner end of the entrance platform and carries it upwardly, and at the end of the upward vertical movement of the carriage, the carriage is then rotated a step in a clockwise direction (when viewed in plan) and pauses in its rotary movement with the can located above the first nozzle 34. The carriage then descends so that the nozzle 34 is projected upward into the can.

Upon the descent of the carriage, the valve operating wing 112, being held in operative position by the can, strikes the valve lever 115 which causes the valve lug 118 to depress the stem 119 of the valve 120 so the cold water is ejected from the nozzle 34 to wash the inner surfaces of the can. At the same time water is ejected from the vertical portions of the pipes 122 and the portion 124, and also through the cover-washing nozzle 123 which sprays the inner surface of the cover substantially as shown in Fig. 16, which also shows how the outer surfaces of the can are washed simultaneously with the spraying of the inner surfaces by the nozzle 34. A cylindrical deflector plate 299 (Figs. 1 and 8) extends upwardly from the top plate 130 in back of the cover racks so that fluids discharged from the cover-cleansing nozzles will be directed downward into the tanks below the nozzles. The carriage next rises and upon doing so, the valve 120 is closed, cutting off the flow of water through the nozzles 34 and 123 and the spray pipes connecting these nozzles. When the carriage reaches its raised position it again rotates a step to bring the can above the next nozzle 35. The carriage then descends and the can is there sprayed inside and outside with hot water while the cover is likewise sprayed.

The travel of the carriage continues in this way, bringing the can from one nozzle to the next and subjecting it to cleansing and sterilizing treatments, until the can reaches the air nozzle 39 where it is dried by the blast of air therefrom. The second air nozzle 40, located in registration with the discharge platform, also directs a blast of air on the can as the can is being ejected. When the carriage finally reaches a point with the can located above the nozzle 40 and descends, the mouth of the then cleaned and dried can strikes the fixed projection or post 150, causing the can to topple over and strike against the abutment 151 which uprights the can on the platform.

As the can is being uprighted onto the discharge platform, the cover is being ejected out of the rack over the compartment from which the can is being discharged, the cover-ejecting elements 193 and 200 causing the cleansed cover to come to rest on the plate 204, as shown in Fig. 8. The arm 210 is then moved up through the opening 226 in the discharge platform and it strikes against the side of the cleansed and uprighted can, forcing the can onto the rollers 155 which carry it away. While the can is being slid toward the rollers 155 by the arm 210, the cover-shifting arm 222 strikes against the flange of the cover supported on the plate 204 and slides the cover from off the plate 204 so that the cover drops down into the mouth of the can and is carried away by the can.

The action of the machine is completely automatic, the attendant merely placing cans to be cleansed on the entrance platform, and at the proper time sliding them toward the inner end of the platform, at the same time placing the covers on the rails 156 and 157. When the cleansing operations are completed the cans with their respective covers are discharged from the machine and carried away together.

What I claim is:

1. A machine for cleansing cans and the like, comprising a stationary frame, a rotary can carriage mounted in the frame, means for raising and lowering the carriage, means for rotating the carriage with an intermittent movement while the carriage is in its raised position, a plurality of nozzles arranged in a circle and over which a can transported by the carriage is successively lowered and held by the carriage, cover-supporting means on the carriage, means for delivering covers to the carriage, nozzles for directing cleansing fluids against the covers, means for discharging the cans from the carriage, means for discharging the covers from the carriage, and means for depositing a cleansed cover removed from the carriage into the mouth of a cleansed can discharged from the carriage.

2. A machine for cleansing cans and the like, comprising a stationary frame, a plurality of equally-spaced nozzles arranged in a circle and projecting upwardly for directing fluid against the inner surfaces of a can lowered over the nozzles successively, a carriage mounted to move in the frame with a raising and lowering movement and also an intermittent rotary movement, for carrying a can from one nozzle to the next and lowering it over each nozzle and supporting it thereover, a plurality of valves corresponding to the nozzles for controlling the passage of fluid to the nozzles, an actuating member for each valve, means carried by the carriage for operating the actuating members each time the carriage descends, means on the carriage for aligning the operating means with the actuating members when cans are on the carriage, a plurality of can-cover racks located on the carriage, means for feeding successive covers to the racks simultaneously with the feeding of successive cans fed to the carriage, a plurality of cover-cleansing nozzles controlled by the valves for directing fluid against the covers, a discharge platform extending laterally from the frame at the periphery of the carriage, a somersaulting device located adjacent the platform, a projection adjacent the last nozzle effective on the descent of the carriage to turn the can over the somersaulting device to land right side up on the discharge platform, means for pushing the uprighted can off the platform, means for ejecting a cover from one of the racks, a support on which the ejected cover is brought to rest, and means for sliding the cover from the support to cause it to fall into the mouth of the can being pushed from the platform.

3. A machine for cleansing cans and the like, comprising a support for a series of upwardly projecting equally-spaced nozzles arranged in a circle adapted to direct fluid against the interior surfaces of cans held in inverted position over the nozzles, a carriage consisting of a frame driven with an intermittent rotary movement and also with a vertical raising and lowering movement, the carriage acting to lift a can from a position over one nozzle and advancing it to a position above the next nozzle and lowering it thereover and supporting it while the nozzle sprays the interior of the can with fluid, a series of valves for controlling the passage of fluid to the nozzles, valve actuating devices, operating devices for the valve actuating devices, said operating devices being located on the carriage and being normally out of alignment with the valve actuating devices, means controlled by a can in position to be acted on by a nozzle for aligning an operating device with a valve actuating device, a cover chute, a platform, means operated by a can as it is pushed along the platform toward the carriage for causing a cover to slide down said chute and be received on the carriage, a rack on the carriage for receiving the cover from the chute, a series of nozzles for directing fluid against the covers while they are held on the carriage, means for ejecting a can and cover simultaneously from the carriage and means for directing the ejected cover into the mouth of the ejected can.

4. A machine for cleansing cans and the like, comprising means for supporting a series of equally-spaced upwardly projecting nozzles arranged in a circle, a rotary can carriage intermittently rotated above the nozzles and having a raising and lowering movement to lift a can from over one nozzle and lower and support it over the next nozzle, means controlled by the up and down movement of the carriage and by the presence of cans on the carriage for supplying fluid to the nozzles, means on the carriage for holding and transporting can covers, a series of nozzles for directing fluid against the covers during pauses in the rotation of the carriage, and means for discharging the cans and covers from the machine.

5. A machine for cleansing cans and the like, comprising a plurality of stationary, equally-spaced nozzles arranged in a circle and projecting upwardly for directing fluid against the interior surfaces of a can lowered over the nozzles successively, a carriage having a vertical reciprocatory movement and an intermittent rotary movement for lowering and supporting the can over the nozzles successively, a plurality of valves corresponding to the nozzles for controlling passage of fluid to the nozzles, means on the carriage for operating the valves, and means for preventing the operation of a valve corresponding to a nozzle when a can is not held by the carriage in position over that nozzle.

6. In a machine of the character described, a frame, a rotary carriage mounted therein, means for intermittently moving the carriage with a rotary movement, means for raising and lowering the carriage, can-cleaning nozzles over which cans supported by the carriage are successively lowered and held by the carriage, means on the carriage for supporting a plurality of can covers, and nozzles for cleansing the can covers simultaneously with the cleansing of the cans by the can cleansing nozzles.

7. In a machine of the character described, an intermittently rotated carriage for receiving and carrying cans, means for raising and lowering the carriage, the carriage having a plurality of pairs of spaced supports on which the cans rest, an entrance platform having an end portion adapted to lie between one of the pairs of supports during each pause in the rotative movement of the carriage and while the carriage is in a lowered position so that a can resting on said end portion of the entrance platform will overlie the pair of supports between which said end portion of the platform is situated, and stop means for preventing a can slid along the platform from reaching said end portion thereof when the carriage is in an elevated position.

8. In a machine of the character described, an intermittently rotated carriage for receiving and carrying cans, means for raising and lowering the carriage, the carriage being divided into a plurality of can compartments into each of which a can is received, an entrance platform having an end portion arranged to project into a compartment during each pause in the rotative movement of the carriage and while the carriage is in lowered position so that a can resting on said end portion of the platform will be located in the compartment, stop means for preventing cans slid along the entrance platform from reaching said end portion of the platform when the carriage is in an elevated position, means on the carriage for holding the stop means in an inoperative position when the carriage is in lowered position, means controlled by a can as it is slid on the entrance platform for causing a cover to be delivered to the carriage, and means on the carriage for holding the cover so delivered.

9. In a machine of the character described, a frame, a rotary carriage mounted therein, means for intermittently moving the carriage with a rotary movement, can-cleansing nozzles equally spaced and arranged in a circle over which the cans supported by the carriage are successively held by the carriage, cover-cleansing nozzles arranged for operation simultaneously with the can-cleansing nozzles, means on the carriage for supporting a plurality of covers, and means for raising the carriage to bring the cans clear of the can-cleansing nozzles and lowering the carriage to bring the cans over the can-cleansing nozzles and the covers on the carriage in alignment with the cover-cleansing nozzles to receive fluid directed therefrom.

10. In a machine of the character described, a frame, a rotary carriage mounted therein, means for intermittently moving the carriage with a rotary movement, vertically extending can-cleansing nozzles arranged in a circle in equally spaced relation over which the cans supported by the carriage are successively held by the carriage, cover-cleansing nozzles arranged for operation simultaneously with the can-cleansing nozzles and located to direct a spray of fluid at an angle to that directed by the can-cleansing nozzles, means on the carriage for supporting a number of covers on their edges with the interiors of the covers directed toward the cover-cleansing nozzles, means for raising the carriage to bring the cans clear of the can-cleansing nozzles and lowering the carriage to bring the cans over the can-cleansing nozzles and the covers on the carriage in alignment with the cover-cleansing nozzles to receive fluid directed therefrom, and means for discharging the cans and covers from the carriage.

11. In a machine of the character described, an intermittently actuated carriage for receiving cans, said carriage being mounted for vertical and rotative movements, the carriage being divided into a plurality of can compartments into each of which a can is received, a cover plate fitted over the several compartments, a rack located on the cover plate over each of the compartments for holding a can cover resting on its edge, an entrance platform arranged to project into one of the compartments during each pause in the rotative movement of the carriage and while the latter is in lowered position, a cover chute located above the entrance platform and adapted to align with the rack which is located over the compartment with which the entrance platform is aligned, movable means on the chute for holding a cover thereon, and means controlled by a can as it is slid into the compartment for moving the cover holding means so that a cover held thereby can slide downward along the chute and be deposited into the rack simultaneously with the entrance of the can into the compartment.

12. In a machine of the character described, a plurality of spaced nozzles arranged in a circle, an intermittently rotated and vertically movable carriage for receiving cans and lowering and holding them successively over the nozzles, the carriage being divided into a plurality of can compartments, each having supporting means on which a can is received, a rack located over each of the compartments for holding a can cover resting on its edge, an entrance platform adapted to align with one of the compartments during each pause in the rotative movement of the carriage and while the carriage is in a lowered position, a cover chute located above the entrance platform and adapted to align with the rack located over the compartment with which the entrance platform is aligned, movable means for preventing downward sliding movement of a cover on the chute, means controlled by a can as it is slid into the compartment for moving the cover-holding means so that a cover held thereby can slide downward on the chute and be deposited into the rack in alignment with the chute simultaneously with the entrance of a can into the compartment, and cover-cleansing nozzles for directing fluids against the covers while they are held in the racks.

13. In a machine of the character described, a rotary carriage for holding and transporting cans and covers, means controlled by the entrance of cans to the conveyor for regulating the entrance of covers thereon, means for simultaneously discharging each can and a cover from the carriage, a discharge platform on which the discharged can is received, a support on which the discharged cover is received, an arm swung with a rotary movement for sliding the discharged can from the discharge platform, and another rotated arm for sliding the cover from the support so that the cover will fall into the mouth of the can being slid from the discharge platform.

14. In a machine of the character described, a rotary carriage for conveying cans and covers, an entrance platform along which cans are moved to place them successively on the carriage, a pair of inclined rails located over the entrance platform and on which successive can covers are placed for delivery to the carriage, a device for holding each cover placed on the rails, said device having a finger lying in the path of the cover, and means controlled by a can on its movement along the entrance platform toward the carriage for withdrawing the finger out of the path of the cover so that the cover may slide downwardly along the rails and fall onto the carriage.

15. In a machine of the character described, a rotary carriage for conveying cans and covers, an entrance platform along which inverted cans are moved to place them successively on the carriage, a pair of inclined rails located over the entrance platform and on which successive can covers are placed for delivery to the carriage, a device for holding each cover placed on the rails, said device having a member lying in the path of the cover, means controlled by a can on its movement along the entrance platform toward the carriage for withdrawing the member out of the path of the cover so that the cover may slide downwardly along the rails and fall onto the carriage, racks on the carriage for receiving the covers as they fall from the rails, a discharge platform for receiving cans from the carriage, means for uprighting the cans onto the discharge platform, a cover support located above the discharge platform, means for receiving covers from the racks and directing them successively onto the support, and means for moving the uprighted cans from the discharge platform and the covers from the support.

16. In a machine of the character described, a plurality of spaced can-cleansing and cover-cleansing nozzles arranged in a circle, an intermittently rotated and vertically movable carriage for conveying inverted cans and covers to the nozzles to be sprayed by fluid therefrom, racks for supporting covers resting edgewise on the carriage, a discharge platform on which the cleansed cans are uprighted, a support for receiving the cleansed covers from the racks, a stationary cover ejector with which one of the racks is adapted to align during pauses in rotative movement of the carriage, said ejector being arranged to hold the cover as the rack is lowered from beneath the cover when the carriage descends, a member inclined downwardly and outwardly for directing the cover toward the cover support, means cooperating with the ejector for directing the cover onto the inclined member, and means for sliding the cover from the support.

17. In a machine of the character described, a plurality of spaced can-cleansing and cover-cleansing nozzles arranged in a circle, an intermittently rotated and vertically movable carriage for conveying inverted cans and their covers to the nozzles to be sprayed by fluid therefrom, racks for supporting covers edgewise on the carriage, a chute for directing the covers into the racks, means for controlling movement of the covers in the chute, a discharge platform on which the cleansed cans are uprighted, a support for receiving the cleansed covers from the racks, a cover-ejector aligning with one of the racks during pauses in rotative movement of the carriage and supporting the cover in said rack so that the rack is lowered from beneath the cover when the carriage descends, a member inclined downwardly and outwardly for directing the cover toward the cover support so that the cover slides along the member and comes to a stop on the support, means cooperating with the ejector for directing the cover onto the inclined member, means for sliding the cover from the support, and means for sliding a can from the discharge platform so that the cover falls into the can.

18. A machine for washing cans and the like comprising, a vertical shaft, a carriage mounted on said shaft and capable of vertical and rotary movement thereon, means driven by the shaft for intermittently rotating the carriage, means for raising and lowering the carriage on the shaft, a series of cover-cleansing nozzles located in spaced relation around the carriage, a series of cover-holding racks on the carriage so located that a cover held in each of the racks is aligned with one of the cover-cleansing nozzles during a pause in the rotative movement of the carriage and while the carriage is in a lowered position, a series of supports on the carriage for holding cans corresponding in number to the covers, and spaced vertically disposed nozzles over which the cans are held by the carriage during pauses in the rotative movement of the carriage.

19. In a machine of the character described, a rotary and vertically reciprocating carriage for conveying cans and covers, means controlled by the entrance of the cans to the carriage for regulating the entrance of the covers thereon, and means for simultaneously discharging each can and a cover therefor from the carriage.

20. In a machine of the character described, a carriage having a rotary and vertical movement for conveying cans and covers, a discharge platform, means for discharging the cans from the carriage and uprighting them on the platform, a cover-support located over the platform, means for discharging covers from the carriage onto the support, means for moving a can from the platform, and means for moving a cover from the support simultaneously with the moving of the can from the platform so that the cover will be dropped into the mouth of the can as it moves from the platform.

JOHN M. McCLATCHIE.